United States Patent
Otto et al.

(10) Patent No.: US 10,513,454 B2
(45) Date of Patent: Dec. 24, 2019

(54) METHOD AND APPARATUS FOR PRODUCING FUSED QUARTZ FROM A POLYMERIZABLE POLYALKYLSILOXANE COMPOUND WITH MEMBRANE FILTER AS CLEANING DEVICE

(71) Applicant: Heraeus Quarzglas GmbH & Co. KG, Hanau (DE)

(72) Inventors: Norbert Otto, Teutschenthal (DE); Martin Trommer, Bitterfeld (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 130 days.

(21) Appl. No.: 15/551,817

(22) PCT Filed: Feb. 17, 2016

(86) PCT No.: PCT/EP2016/053311
§ 371 (c)(1),
(2) Date: Aug. 17, 2017

(87) PCT Pub. No.: WO2016/131849
PCT Pub. Date: Aug. 25, 2016

(65) Prior Publication Data
US 2018/0065879 A1   Mar. 8, 2018

(30) Foreign Application Priority Data
Feb. 18, 2015   (EP) .................................... 15155566

(51) Int. Cl.
  *C03B 19/14*   (2006.01)
(52) U.S. Cl.
  CPC ...... *C03B 19/1415* (2013.01); *C03B 2207/32* (2013.01); *C03B 2207/81* (2013.01)

(58) Field of Classification Search
  CPC ................................ C03B 19/14; C03B 19/01
  See application file for complete search history.

(56) References Cited

U.S. PATENT DOCUMENTS

| | | | | |
|---|---|---|---|---|
| 5,599,371 A | * | 2/1997 | Cain ................... | C03B 19/1423 65/17.4 |
| 5,703,191 A | * | 12/1997 | Henderson .......... | C03B 19/1415 528/31 |

(Continued)

FOREIGN PATENT DOCUMENTS

| | | |
|---|---|---|
| EP | 0765845 A1 | 4/1997 |
| EP | 1057792 A1 | 12/2000 |

(Continued)

OTHER PUBLICATIONS

Int'l Search Report dated Apr. 29, 2016 in Int'l Application No. PCT/EP2016/053311.

(Continued)

*Primary Examiner* — Cynthia Szewczyk
(74) *Attorney, Agent, or Firm* — Panitch Schwarze Belisario & Nadel LLP

(57) ABSTRACT

A method for producing synthetic fused quartz is provided. The method includes evaporating a feedstock material which contains at least one polymerizable polyalkylsiloxane compound, and supplying the feedstock material vapor to a reaction zone, wherein the feedstock material vapor is converted by oxidation and/or by hydrolysis into $SiO_2$ particles. The feedstock material vapor is passed through a membrane filter as a cleaning device to reduce the formation of gel, which is typically associated with the production of synthetic fused quartz.

28 Claims, 1 Drawing Sheet

(56) References Cited

U.S. PATENT DOCUMENTS

| | | | |
|---|---|---|---|
| 5,707,415 A | 1/1998 | Cain | |
| 5,979,185 A * | 11/1999 | Blackwell | C01B 33/18 65/17.4 |
| 6,590,116 B1 * | 7/2003 | Flynn | B01D 15/00 556/460 |

FOREIGN PATENT DOCUMENTS

| JP | S5313438 A | 2/1978 |
|---|---|---|
| WO | 9847946 A1 | 10/1998 |

OTHER PUBLICATIONS

Int'l Preliminary Report on Patentability dated Aug. 31, 2017 in Int'l Application No. PCT/EP2016/053311.

* cited by examiner

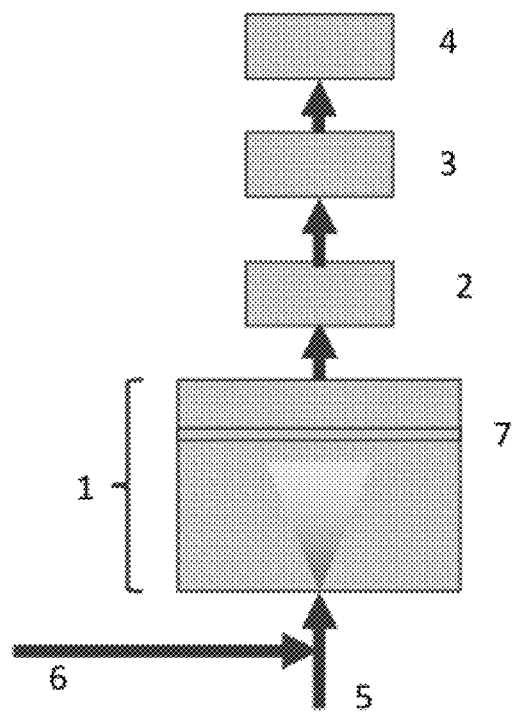

METHOD AND APPARATUS FOR PRODUCING FUSED QUARTZ FROM A POLYMERIZABLE POLYALKYLSILOXANE COMPOUND WITH MEMBRANE FILTER AS CLEANING DEVICE

CROSS-REFERENCE TO RELATED APPLICATIONS

This application is a Section 371 of International Application No. PCT/EP2016/053311, filed Feb. 17, 2016, which was published in the German language on Aug. 25, 2016, under International Publication No. WO 2016/131849 A1, and the disclosure of which is incorporated herein by reference.

BACKGROUND OF THE INVENTION

The present invention relates to a method for producing synthetic quartz glass and to a device for producing synthetic quartz glass, which can be used within the scope of the method according to the present invention. The method according to the present invention and the device according to the present invention are characterized by a special membrane filter.

For producing synthetic quartz glass, $SiO_2$-particles are produced from a silicon-containing starting substance in a CVD-procedure by means of hydrolysis or oxidation and deposit on a moving support. The method can be subdivided into external and internal deposition methods. In the case of external deposition method, the $SiO_2$-particles are applied onto the outside of a rotating support. Examples of pertinent external deposition methods include the so-called OVD method (Outside Vapor Phase Deposition), the VAD method (Vapor Phase Axial Deposition) or the PECVD method (Plasma Enhanced Chemical Vapor Deposition). The best-known example of an internal deposition method is the MCVD method (Modified Chemical Vapor Deposition), in which $SiO_2$-particles are deposited on the inner wall of a tube heated from outside.

If the temperature in the area of the support surface is sufficiently high, the $SiO_2$-particles vitrify directly, which is also known as "direct vitrification". In contrast, the temperature during the deposition of the $SiO_2$-particles in the so-called "soot method" is so low that a porous $SiO_2$-soot layer is obtained, which is then sintered into transparent quartz glass in a separate process step. Both, direct vitrification and the soot method lead to a dense, transparent, high pure, synthetic quartz glass.

Silicon tetrachloride ($SiCl_4$), is known from the prior art as a silicon-containing production material for the production of synthetic quartz glass. Silicon tetrachloride and other analogous chlorine-containing substances possess sufficient vapor pressures already at moderate temperatures below 100° C., such that any impurities usually remain in the liquid phase and the production of ultrapure soot bodies is made easier.

However, it is known that, during the evaporation of the silicon tetrachloride, partially liquid drops are entrained within the inert vapor stream used and are not completely evaporated until the reaction zone has been reached. Thus, the impurities contained in the liquid phase finally reach the soot-body and thus deteriorate the quality of the quartz glass produced thereof. The impurities are usually metals.

A further disadvantage of the chlorine-containing production materials, such as silicon tetrachloride, is the production of hydrochloric acid when converted into synthetic quartz glass, which causes high costs for exhaust gas scrubbing and disposal. Therefore, in principal, when silicon tetrachloride is used, devices which prevent the entry of moisture are used. This reduces the formation of hydrochloric acid and avoids the formation of silica acid. This procedure is familiar to a person skilled in the art.

In the past, in order to circumvent these requirements, a large number of so-called crystal-free organosilicon compounds have been tested as production materials for quartz glass production. Examples include monosilanes, alkoxysilanes, siloxanes and silazanes. A particularly interesting group of these so-called chlorless organosilicon compounds are the polyalkylsiloxanes (also called briefly as "siloxanes"), which are known, for example, from DE 30 16 010 A1. In particular, the cyclic polyalkylsiloxanes which can be subsumed under the polyalkylsiloxanes are distinguished by a particularly high proportion of silicon per weight proportion, which contributes to the economic efficiency of their use in the production of synthetic quartz glass. Due to the industrial availability in high purity, octamethylcyclotetrasiloxane (OMCTS) is used in particular.

Such polyalkylsiloxane compounds are polymerizable and are typically present in the production material in pure form or as a mixture with other components in liquid form. These compounds can also contain traces of polymerizable silanols. The polyalkylsiloxane compounds can be fed to the consuming unit, such as a deposition burner, in the liquid form and sprayed at the burner outlet or in the flame. Usually, however, the production material is converted into a gaseous or vapor phase by means of an evaporator and fed to the consuming unit as a continuous gas stream via a line system.

Several methods for the production of synthetic quartz glass, based on these so-called chlorine-free production materials, are described in the prior art. For example, reference is made to EP 0 760 373 A, WO 99/15468 A, WO 99/54259 A, WO 2013/092553 A and EP 0 529 189 A.

However, the use of polyalkylsiloxanes involves other difficulties with regard to possible influences of impurities of the production material on the quality of the resulting quartz glass, in a fundamental difference from the methods described above, in which the low molecular metallic impurities in the silicon tetrachloride reduce the quality of the resulting quartz glass and at the same time, the entry of moisture is avoided. In principle, silicon tetrachloride is thermally more stable than the cyclic polyalklysiloxanes and their boiling point is much lower. On the other hand, the cyclic polyalkylsiloxanes do practically react with moisture at room temperature. However, one of the main problems associated with the use of cyclic polyalkylsiloxanes is that polymerizations take place with formation of gel-like and rubbery residues under the used evaporation conditions. As already stated above, it is known that polyalkylsiloxanes may contain traces of polar impurities such as water, silanols and sometimes even polymerization-catalytically-acting trace components (e.g. Lewis acids or Lewis bases). In the case of the silanols, these impurities can either react with themselves to form polymers or initiate ring-opening reactions with the starting compound. This ultimately leads to the formation of the abovementioned polymer siloxane residues and gels. These polymers and gels usually remain in the evaporator, in the steam lines, control valves, throttles, other gas metering devices and lines, and are concentrated therein. This can lead to a massive impairment of the control behavior of the material streams. Reproducible process management is thus made difficult. In extreme cases, this leads to clogging. Both effects increase the downtime for maintenance and cleaning steps, whereby a process using polyalkylsiloxanes entails pertinent costs.

On the other hand, these residues also have a negative effect on the properties of the resulting quartz glass, since the equal distribution of the mass flows of the production material vapor is uncontrollable and thus not reproducibly affected. This increases the radial and axial density variation in the soot and the variation in the chlorine content in the subsequent dehydration or chlorination step. Furthermore, such residues lead to an increase in the outside diameter variation in a multi-burner method. This, in turn, has an impact on the rejects associated with corresponding material loss. This results in poorer process efficiency combined with increased production costs. In addition, the production material is generally subject to certain batch variations, which are in the ppm range, but nevertheless contribute to the above-described lack of controllability and reproducibility of the process. Raw materials from different manufacturers also have different impurities/contamination levels, so that the control over the quality of the resulting quartz glass is not ensured.

A poorer process efficiency combined with increased production costs is the consequence. In addition, the starting material is, in itself, generally subject to certain batch fluctuations which, although they are in the ppm range, nevertheless contribute to the above-described controllability and reproducibility of the process. As further prior art which relates to the problem of gel formation during the vaporization of polyalkylsiloxanes, mention may be made of U.S. Pat. No. 5,879,649, EP 1 094 990 A, WO 2013/092553 A, EP 0 463 045 A, U.S. Pat. No. 5,970,751, and US Patent Application Publication No. 2012/0276291 A.

To solve these problems, U.S. Pat. No. 5,558,687 proposes to spray the polyalkylsiloxane component initially and to apply it partially in liquid form to a packing material. A similar procedure is described in EP 0 765 845 A in connection with the use of silicon tetrachloride.

The solution possibilities disclosed in the prior art are still not yet satisfactory. An objective of the present invention is therefore to provide a method in which the gel formation in the production of synthetic quartz glass is reduced.

An objective of the present invention is also to provide a method and an apparatus for producing synthetic quartz glass, in which the mass flows of the production material vapor are essentially controllable and thus reproducible.

A further objective of the present invention is to provide a method and a device for producing synthetic quartz glass in which, in particular, the radial and axial density variation in the soot and the variation in the chlorine content are reduced in the subsequent dehydration or chlorination step.

A further objective of the present invention is to provide a method and a device for producing synthetic quartz glass in which, in particular, the outside diameter variation in a multi-burner process is reduced.

These objectives are achieved by the method according to the present invention for producing synthetic quartz glass, as described below, and the device according to the present invention which is used in the method and which is also described below.

BRIEF SUMMARY OF THE INVENTION

According to the present invention, a method for producing synthetic quartz glass comprises the following steps of:

(a) evaporating a production material that contains at least one polymerizable polyalkylsiloxane compound while forming a production material vapor;

(b) passing the production material vapor resulting from process step (a) through at least one cleaning device to clean the production material vapor;

(c) supplying the purified production material vapor resulting from process step (b) to a reaction zone, in which the production material vapor is converted to $SiO_2$ particles through oxidation and/or through hydrolysis;

(d) depositing the $SiO_2$ particles resulting from process step (c) on a deposition surface; and (e) optionally, drying and vitrifying the $SiO_2$ particles resulting from process step (d) to form synthetic quartz glass.

In the process according to the present invention, the at least one polyalkylsiloxane compound is conducted in the process step (b) through a membrane filter which is heated to a temperature of 130 to 210° C.

Surprisingly, it has been found that the tendency of the production material vapor to polymerize and/or to form gels is reduced by using a membrane filter operating at a temperature of 130 to 210° C.

This is particularly surprising in that, on the one hand, it is described in the prior art that the impurities causing the polymerization are not volatile and must therefore be separated from the liquid phase. On the other hand, this is surprising since the oligomeric and/or polymeric components which have been formed during evaporation can be separated by the use of a membrane filter to that extent so that the membrane filter is not subjected to clogging by polymer deposits and/or gel formation.

This leads, surprisingly, to the fact that, in total, the pressure drop over the bulk remains low, in particular technologically and economically reasonable, and that an expensive, upstream liquid/solid extraction process in the liquid phase can be avoided.

Without wishing to be bound by a certain theory, it is suspected that various types of trace impurities are contained in the production material which may cause residues in the evaporator and in the steam line.

A) High-boiling Trace Impurities

High-boiling trace impurities are characterized by the fact that they can be evaporated much more difficult and can remain in the evaporator and in the evaporator lines due to their very low vapor pressure or low dew point, and can be linked to gel-like residues in the evaporating system in case of long dwell time.

B) Polar Trace Impurities

Reactive polar trace impurities can, for example, be the above-mentioned silanols. These trace impurities can initiate the ring-opening reactions of the cyclic siloxanes due to their polar OH-groups. They can react to higher boiling impurities via a condensation reaction with the main cyclic components, which then also accumulate as gel-like impurities in the steam line.

C) Catalytically Active Trace Impurities

Reactive catalytically active trace impurities are, for example, Lewis acids and Lewis bases. These compounds can initiate ring-opening reactions in the presence of traces of residual moisture. These can also be, for example, metallic trace impurities (metal oxides and/or metal halides), which also participate in the ring-opening reactions of the cyclic siloxanes. A further reaction with the main cyclic components may result in higher-boiling impurities which then also accumulate as gel-like impurities in the steam line.

The high-boiling trace impurities under (A) as well as the polymeric secondary products resulting from the reaction of the reactive trace impurities under (B) and (C) (e.g. silanols, Lewis acids and Lewis bases) with the raw material and which are mobile and accumulate in the vapor phase at throttles, regulating valves and the like, can, surprisingly and according to the present invention, be removed from the raw material vapor particularly effective and efficiently when the production material is passed in the form of a production material vapor through a heated cleaning device which has a membrane filter.

The method or device according to the present invention, described below, are therefore particularly suitable for producing synthetic quartz glass, wherein the high-boiling trace impurities under (A) and/or the polymeric secondary products obtained from the reaction of the reactive trace impurities under (B) and/or (C) with the raw material, are removed in the manufacturing process by the membrane filter according to the present invention.

Thus, by means of the membrane filter provided according to the present invention, the high-boiling traces impurities under (A) and, in particular, the mobile polymeric secondary products resulting from the reaction of the trace impurities (B) and (C) with the raw material, can be retained, so that significantly less disturbing deposits occur on the sensitive throttles and control valves. Thus, batch differences in the starting compounds can be compensated, so that the produced synthetic quartz glass in all has a consistently good quality. Thus, together with the fact that a uniform distribution of the mass flows can be achieved as a result of the reduction and/or avoidance of polymer and/or gel deposition in the steam lines, control valves, throttles, other gas metering devices and lines, the method can be carried out in a controlled and reproducible manner by means of the subject-matter of the present invention. As indicated above, this leads to a significant cost saving.

BRIEF DESCRIPTION OF THE SEVERAL VIEWS OF THE DRAWINGS

The foregoing summary, as well as the following detailed description of the invention, will be better understood when read in conjunction with the appended drawing. For the purpose of illustrating the invention, there is shown in the drawing, an embodiment which is presently preferred. It should be understood, however, that the invention is not limited to the precise arrangements and instrumentalities shown.

In the drawing:

FIG. 1 is a schematic representation of a device for producing synthetic quartz glass according to an embodiment of the present invention.

DETAILED DESCRIPTION OF THE INVENTION

The individual process steps of the method according to the present invention are now explained in more detail below.

Process Step (a)—Evaporation of the Production Material

In the process step (a), a production material which contains at least one polymerizable polyalkylsiloxane compound is evaporated to form a production material vapor.

In principle, any polymerizable polyalkylsiloxane compound which is suitable for the production of synthetic quartz glass can be used according to the present invention. Within the scope of the present invention, the term polyalkylsiloxane comprises both linear (including also branched structures) as well as cyclic molecular structures.

Particularly well-suited cyclic representatives are polyalkylsiloxanes having the following general sum formula

whereby, p is an integer greater than or equal to 2. The radical "R" is an alkyl group, in the simplest case, a methyl group.

Polyalkylsiloxanes are characterized by having a particularly high fraction of silicon per weight fraction, which contributes to the economic efficiency of their use in the production of synthetic quartz glass.

In this context, the polyalkylsiloxane compound is preferably selected from the group consisting of hexamethylcyclotrisiloxan (D3), octamethylcyclotetrasiloxan (D4), decamethylcyclopentasiloxan (D5), dodecamethylcyclohexasiloxan (D6), tetradecamethyl-cycloheptasiloxan (D7), hexadecamethylcyclooctasiloxan (D8), and their linear homologues and any mixtures of the abovementioned compounds. The notation D3, D4, D6, D7 and D8 is derived from a notation introduced by General Electric Inc., in which "D" represents the group $[(CH_3)_2Si]$—O—. The notation is known to those skilled in the art.

Mixtures of the above-mentioned polyalkylsiloxane compounds can be used just as well in the scope of the present invention.

Due to the availability of commercial quantities at high purity, octamethylcyclotetrasiloxane (OMCTS) is preferably currently used. It is therefore particularly preferred, in the scope of the present invention, if the polyalkylsiloxane compound is octamethylcyclotetrasiloxane (D4).

In general, it is possible for the production material to be subjected to a purification step before the introduction into process step (a). Those skilled in the art are aware of such purification methods. In a preferred embodiment, however, the production material is not previously subjected to an upstream purification process. This means that the production material is preferably not subjected to a process in which any impurity is removed from the commercially available product. Preferably, no impurities (A) to (C), as described above, are removed. More preferably, in the process according to the present invention, the liquid production material of the at least one polymerizable polyalkylsiloxane compound is not subjected to solid phase extraction prior and/or during the evaporation. Thereby, the production material is preferably not subjected to liquid/solid phase extraction. Surprisingly, it has been found that quartz glass with high controllability and reproducibility can nevertheless be produced by the method according to the present invention. In particular, in that an additional cleaning step can be omitted, the method or apparatus according to the present invention can save costs by saving time and reducing the downtimes.

Moreover, if the production material is not subjected to liquid/solid phase extraction in particular, it is possible to avoid additional contamination from the solid phase into the production material, as explained above.

The evaporation of the production material can be carried out with or without the presence of a carrier gas component. Preferably, the evaporation of the production material is carried out in the presence of a carrier gas, since this allows evaporation to take place at temperatures below the boiling point of the polyalkylsiloxane compound. This means that preferably, the production material vapor additionally comprises a carrier gas. Such a procedure is preferred if the evaporation of the production material should take place below its boiling point. The inert gas is preferably chemically inert and is more preferably nitrogen or argon. Alternatively, oxygen can also be used as the carrier gas. The molar ratio of the polymerizable polyalkylsiloxane compound to the carrier gas is preferably in the range from 0.01 to 2, particularly preferably in the range from 0.02 to 1.5, and more particularly preferably in the range from 0.05 to 1.25. In particular, it is preferred that the carrier gas is nitrogen with a moisture content of less than 40 ppm by volume and as a polyalkylsiloxane compound, OMCTS is used. In this case, it is also preferred that the molecular ratio of OMCTS to nitrogen is in the range from 0.015 to 1.5.

The process step of the evaporation is known per se to a person skilled in the art. The polyalkylsiloxane compound is converted into a vapor phase at temperatures between 120 and 200° C., depending on the selected molecular ratio of the polyalkysiloxane compound and carrier gas. The evaporation temperature in the evaporation chamber should always be at least a few degrees above the dew point of the polyalkylsiloxane compound. The dew point is again dependent on the selected molecular ratio of polyalkylsiloxane compound and carrier gas. In a preferred embodiment, the polyalkylsiloxane compound is preheated to temperatures between 40 and 120° C. before evaporation and then sprayed into an evaporation chamber which has a higher temperature than the pre-heating of the production materials. In a preferred embodiment, the inert carrier gas can additionally be preheated to temperatures of up to 250° C. before it is led to the evaporation chamber. It is advantageous that the temperature in the evaporation chamber is, on average, always above the dew point temperature of the mixture of polyalkylsiloxane and carrier gas. Suitable evaporation processes are described, for example, in the International Patent Application Publication Nos. WO 2013/087751 A and WO 2014/187513 A, as well as in German Patent Application No. DE 10 2013 209 673.

Within the scope of the present invention, the term "dew point" describes the temperature at which an equilibrium state of condensing and evaporating liquid is established.

When temperatures below the boiling point of the production material are used, the evaporation is preferably carried out together with an inert carrier gas.

Within the scope of the present invention, "evaporation" is understood to mean the process in which the production material is essentially converted from the liquid phase into a gas-phase. This is preferably done by using, as described above, temperatures above the dew point of the polymerizable polyalkylsiloxane compound as the main component of the production material. The person skilled in the art is aware that technologically cannot be excluded that small liquid drops of the production material can be entrained. Thus, in process step (a), a production material vapor is preferably produced which preferably contains not less than 97 mol %, preferably not less than 98 mol %, more preferably not less than 99 mol %, and particularly preferably not less than 99.9 mol % of gaseous components.

The production material vapor generated by the process step (a) is fed subsequently to the process step (b).

Process Step (b)—Purification of the Production Material Vapor

In process step (b), the production material vapor resulting from process step (a) is conducted through at least one cleaning device in order to clean the production material vapor. The cleaning device of process step (b) comprises a membrane filter which is heated to a temperature of 130 to 210° C.

Within the scope of the present invention, the temperature at which the membrane filter is heated is the temperature of the filter membrane and/or of the supporting body in which the membrane is held or supported mechanically.

The temperature selection for the operation of the corresponding membrane is targeted since, according to the present invention, it has been found that when the temperature is too cold, i.e. in particular if the temperature falls below 130° C., the condensed polyalkylsiloxane condenses again. As is known to the person skilled in the art, the dew point of the vaporized polyalkylsiloxane depends on the molar ratio of the amount of carrier gas used and the vaporized polyalkyl siloxane and the present absolute pressure in the evaporation system. If the dew point on the membrane filter falls below, the membrane is covered with a liquid film and thus blocks the flow of steam. On the other hand, at high temperatures, in particular at temperatures above 210° C., there exists the danger that the structure of the membrane is altered by thermal deformation and thus becomes unusable.

In a preferred embodiment, the membrane filter is heated to a temperature of 140 to 190° C. Furthermore, it is preferred, regardless of the temperature, that the membrane filter is heated to a temperature which is higher by 3 to 80° C., in particular 3 to 60° C., more preferably 7 to 40° C. than the dew point of the polyalkylsiloxane compound used, which is established in the steam mixture of the amount of carrier gas used and the vapourous polyalkylsiloxane compound, since otherwise a permanent use of the membrane in a continuous process cannot be ensured.

Furthermore, it has been found to be preferred if the average pore size of the membrane filter is up to 0.5 µm, more preferably up to 0.2 µm, and even more preferably to 0.02 µm.

Within the scope of the present invention, it is particularly preferred if the membrane filter comprises at least one material selected from the group consisting of polytetrafluorethylene, perfluoroalkoxy polymers (PFA), perfluoroalkoxyvinylethers or polyethersulfones, or one or more of the abovementioned materials. A commercially suitable membrane system is, for example, the membrane filter UltiKleen™-CDS filter from Pall Microelectronics.

The membrane filters, which are suitable according to the present invention, can be adapted with regard to their size, with measurements usually known to a person skilled in the art, to the corresponding device used. Membrane filters which are usually used, have an average maximum thickness of the membrane filter parallel to the flow direction of the production material vapor of less than 200 µm, more preferably less than 100 µm, and even more preferably less than 50 µm. According to the present invention, the membrane area is to be selected as large as possible, since more polymers can be absorbed with increasing the membrane area. Particularly preferably, a membrane size is selected which ensures a throughput of 0.5 to 500 kg/h per m$^2$ of membrane area, more preferably from 1 to 400 kg/h per m$^2$ of membrane area, based on OMCTS.

Within the scope of the method according to the present invention, it is also preferred if the pressure difference on the filter membrane between the retentate and permeate side is less than 800 mbar, more preferably less than 600 mbar, even more preferably less than 400 mbar. It has been found that when the differential pressure between the retentate and the permeate side is too high, there exists the risk that the "mobile" polymers retained on the membrane are being quasi-pushed through the membrane. Therefore, it should be ensured that the differential pressure between the retentate and permeate side is not too high, and is preferably within the ranges defined above.

Without wishing to be bound by theory, it is assumed that the method according to the present invention leads to a polymer formation of essentially highly crosslinked polymers and substantially less strongly crosslinked polymers. While the essentially highly crosslinked polymers are generally fixed in the evaporator area, for example formed as a sticky, rubber-like layer or mass on the pipe wall or evaporator wall, the less strongly crosslinked polymers have still sufficient mobility and can be further transported within the steam flow and thus reach the sensitive throttles and control valves. The method according to the present invention is therefore particularly suitable for the removal of essentially less strongly crosslinked polymers from the production material vapor during the production of quartz glass.

Therefore, in a first embodiment, the method according to the present invention is particularly suitable for the separation of polymethylsiloxanes which are formed from the high-boiling trace impurities under (A) as defined above.

In a second embodiment, the method according to the present invention is particularly suitable for the separation of polymethylsiloxanes which are formed from the reaction of the trace impurities (B) and (C) with the production material.

The polymethylsiloxanes to be separated by the method according to the present invention according to the first and the second embodiments preferably have a molecular weight of 500 to 1800 g/mol. It would normally be expected that polyalkylsiloxanes having molecular weights of this type would pass through the membrane provided according to the present invention in the gas phase. Without wishing to be bound by theory, however, it is assumed that the polyalkylsiloxanes resulting from the reaction of the trace impurities (B) and (C) are retained in the form of microdroplets on the membrane, possibly due to the very low vapor pressure, and through formation of polymers with increasing dwell time, remain attached to the membrane. After a sufficiently long period of use, flat deposits of polymer films consisting of polyacylsiloxanes are found on the membrane.

In particular, these polymethylsiloxanes crosslink on the membrane further to polymethyl-siloxanes having molecular weights of preferably more than 1800 g/mol with increasing dwell time. These oligomeric or polymeric polymethylsiloxanes are usually cyclic as well as linear polyalkysiloxanes. There may be cyclic polymethylsiloxanes, for example 8, D9, D10, and D11. However, it can also be linear polymethylsiloxanes whose terminal Si-atoms may be, for example, a trimethylsilyl group or a dimethylsilanol group.

While a good purification of the production material vapor occurs, whereby gel and polymer formation within the subsequent devices can be avoided and which leads to good controllability and reproducibility of the quartz glass production, the use of a corresponding membrane filter is particularly durable and impaired in particular by only a low pressure drop across the packing the entire process flow of the quartz glass adjustment only minimally. The replacement of the membrane filter, which is rarely necessary, leads to low downtimes. In addition, the cleaning device is simple in terms of apparatus and can even be subsequently integrated into existing devices for producing quartz glass.

According to the present invention, the inflow velocity of the production material vapor from process step (a) into the cleaning step with the membrane filter is preferably 0.01 to 2 m/s, and particularly preferably 0.02 to 1 m/s. At these speeds, a good cleaning performance can still be achieved despite the high throughput.

In the process step (b), the production material vapor should have a temperature of more than 100° C., preferably more than 120° C. and particularly preferably more than 130° C. This ensures that the production material remains essentially in the steam form. If appropriate, additional heating devices can be provided for this purpose in order to ensure this temperature of the production material vapor.

According to the present invention, in particular, the mobile polymeric secondary products, which are formed from the reaction of the trace impurities (B) and (C) with the production material, are predominantly retained on the membrane, so that significantly less disturbing deposits can deposit on the sensitive throttles and control valves. In particular, with the cleaning step (b) according to the present invention, a production material vapor can be provided which has a reproducibly constant composition. As a result, batch fluctuations in the liquid production material have no influence on the quality of the resulting synthetic quartz glass.

Process Step (c)—Conversion of the Production Material Vapor

In the process step (c), the purified production material vapor, resulting from process step (b), is led to a reaction zone in which the production material vapor is converted to $SiO_2$ particles by oxidation and/or by hydrolysis.

This process step corresponds, in particular, to a known soot process or a known direct vitrification method. The possible embodiments are known to a person skilled in the art.

Process Step (d)—Depositing the $SiO_2$ Particles

In the process step (d), the SiO2 particles resulting from process step (c) are deposited on a deposition surface. The possible embodiments are known to a person skilled in the art.

Process Step (e)—Optionally Drying and Vitrification

In the process step (e), the $SiO_2$ particles resulting from process step (d) are dried and vitrified, if necessary, to form synthetic quartz glass. This process step is necessary, in particular, if the previously performed process steps have been carried out according to a soot process. The possible embodiments are known to a person skilled in the art.

Overall, the method according to the present invention is also suitable for the production of synthetic quartz glass by "direct vitrification". In this method, due to the sufficient high temperatures during the deposition of the $SiO_2$ particles on a deposition surface in the process step (d), direct vitrification of the $SiO_2$ particles occurs. Therefore, in case of "direct vitrification", the optional process step (e) is omitted. Furthermore, the method according to the present invention is also suitable for the production of quartz glass by the "soot process", in which the temperature during the deposition of the $SiO_2$ particles in process step (d) is so low that a porous $SiO_2$ soot layer is obtained, which is dried and vitrified in the separate process step (e) to give synthetic quartz glass.

The process according to the present invention is suitable for producing synthetic quartz glass, which is carried out as an external or internal deposition method. If the method according to the invention is carried out as an external deposition method, this is preferably an OVD method (Outside Vapor Phase Deposition), VAD method ((Vapor Phase Axial Deposition) or PECVD method (Plasma Enhanced Chemical Vapor Deposition). If the process according to the invention is carried out as an internal deposition method, it is preferably an MCVD method (Modified Chemical Vapor Deposition).

In another aspect of the present invention, an apparatus for producing a synthetic quartz glass is provided, comprising the following components:

at least one evaporator zone 1 for evaporating at least one production material which contains at least one polymerizable polyalkylsiloxane compound to form a production material vapor;

at least one cleaning device 2 into which the production material vapor, resulting from the at least one evaporator zone 1, is led, and which comprises a membrane filter;

at least one reaction zone 3 into which the purified production material vapor, resulting from the at least one cleaning device 2, is passed, and in which the production material is converted to $SiO_2$ particles by pyrolysis or by hydrolysis; and at least one deposition zone 4 with a deposition zone for the $SiO_2$ particles resulting from the reaction zone 3, to form synthetic quartz glass.

The device according to the present invention serves preferably conduct of the method according to the invention. Thus, all the above-described preferences, which have three-dimensional physical characteristics, are also preferred for the device according to the present invention.

The device according to the present invention is explained below by way of example with reference to FIG. 1.

The apparatus according to the present invention comprises at least one evaporator zone 1. At least one production material containing at least one polymerizable polyalkylsiloxane compound is evaporated in this evaporator zone to form a production material vapor. The production material described above can be used as production material in all individual or combined embodiments.

Thus, the evaporator zone 1 comprises a supply line 5 for the at least one production material. Optionally, the evaporator zone may also comprise a supply line 6 for an inert gas.

Transition of the liquid production material into the gas phase occurs in the evaporation zone 1, forming a production material vapor. Embodiments of such an evaporation zone are known to a person skilled in the art.

The vaporized production material enters the cleaning device 2 via heated pipelines. In addition, the cleaning device 2 can comprise a control device for measuring and/or adjusting the production material vapor velocity. Furthermore, the pressure loss before and after the cleaning device of the membrane filter can be measured. It is also possible to draw conclusions about the state of the cleaning device 2 via the data obtained by the control device and, if necessary, to recognize the necessity of an exchange or a cleaning operation.

The cleaning device 2 may further comprise at least one temperature control unit. This is to ensure that the production material vapor is held in the gas phase in the at least one cleaning device 2, at a temperature above 100° C., preferably above 120° C.

The membrane filter is preferably located in a temperature-resistant housing which preferably consists of stainless steel and which is connected on the inlet side to the evaporator via a pipeline. Behind the membrane filter are the metering and/or regulating devices, which then supply the deposition burners with the raw material. When several burners are used in the deposition process, the deposition burners are supplied with the vaporized raw material via a distributor system.

The production material vapor is preferably led from the evaporator zone 1 into the cleaning apparatus 2 in a substantially straight path.

The at least one reaction zone 3 of the device according to the present invention is known to a person skilled in the art. The purified production material vapor resulting from the at least one cleaning device 2 is led therein, and the production material is being converted into $SiO_2$ particles by oxidation and/or by hydrolysis. An embodiment according to the above-described direct vitrifying method or the soot method can be provided here.

The at least one deposition zone 4 with a deposition zone for the $SiO_2$ particles resulting from the reaction zone 3 is also known per se to a person skilled in the art.

In a further aspect of the present invention a use of a membrane filter for purifying a production vapor containing at least one polymerizable polyalkylsiloxane compound is provided. The membrane filter can preferably be all individual or combined embodiments described above.

In a first embodiment, the membrane filter is particularly suitable for the separation of polymethylsiloxanes which are formed from the high-boiling trace impurities under (A) as defined above.

In a second embodiment, the method according to the invention is particularly suitable for the separation of polymethylsiloxanes which are formed from the reaction of the trace impurities (B) and (C), as defined above, with the production material.

The polymethylsiloxanes to be separated according to the first and the second embodiments preferably have a molecular weight of from 500 to 1800 g/mol.

In particular, these polymethylsiloxanes crosslink on the membrane further to polymethyl-siloxanes having molecular weights of preferably more than 1800 g/mol with increasing dwell time. These oligomeric or polymeric polymethylsiloxanes are usually cyclic as well as linear polyalkysiloxanes. There may be cyclic polymethylsiloxanes, for example D8, D9, D10, and D11. However, it can also be linear polymethylsiloxanes whose terminal Si-atoms may be, for example, a trimethylsilyl group or a dimethylsilanol group.

In a further aspect of the present invention, synthetic quartz glass is provided which is obtainable by the method according to the present invention. The quartz glass obtained in this way has a homogeneity and reproducibility which results from the efficient purification of the production material vapor.

EXAMPLE

The liquid production material OMCTS is evaporated in an evaporator at 170° C. according to the embodiment of International Patent Application PCT/EP2012/075346, the contents of which are incorporated herein by reference, together with nitrogen as carrier gas, which has been preheated to 180° C. The composition of the nitrogen-OMCTS vapor mixture is set in a way that the dew point of OMCTS under the selected process conditions is 125° C. The vaporized production material is passed via heated pipes at 175° C. through a membrane filter heated to a temperature indicated in Table 1 below, from Pall Ulticlean CDS-filter all-fluoropolymer cartrige type ABF UFR3EH1 (removal rating 0.2 µm). The pressure difference at the filter is monitored, whereby the maximum pressure difference before and after the membrane is not to exceed 800 mbar, preferably not more than 500 mbar.

TABLE 1

| Example | Operation with/without membrane filter | Temperature membrane filter | Deposits in the steam distribution system behind the membrane filter after the evaporation of 2 to OMCTS | max OD-Variation on the vitrified product after the evaporation of 2 to OMCTS in the multibenner process |
|---|---|---|---|---|
| 1 | yes | 135° C. | ++ | ≤8 mm |
| 2 | yes | 175° C. | ++ | ≤5 mm |
| 3 | yes | 190° C. | ++ | ≤7 mm |
| 4 | yes | 205° C. | + | ≤10 mm |
| 5 | no | Without membrane filter | -- | ≥15 mm |
| 6 | no | Without membrane filter | -- | ≥14 mm |
| 7 | no | Without membrane filter | -- | ≥16 mm |

In the above Table 1, the individual abbreviations have the following meaning:

++: There is no visual evidence of polymeric deposits in the steam piping system behind the filter.

+: In the steam piping system behind the filter, only small spots with polymeric deposits are found.

−: There are clear indications for deposits in the steam piping system.

The deposits in the evaporator system behind the membrane filter are a measure of the effectiveness of the membrane filter, whereby the effectiveness after the evaporation of 2 to OMCTS is measured:

a) in the form of polymeric deposits visually visible in the steam distribution system behind the filter; and b) in the form of OD-Variations on the vitrified product in the multibenner process.

In contrast to a comparable method without a membrane filter, after the evaporation of >10 to OMCTS, not a single maintenance and cleaning action on dosing devices was necessary. Furthermore, a significantly improved reproducibility of the processes as well as an improved product homogeneity (axial homogeneity of the soot body or quartz glass) was found.

It is expected that, above 210° C., the membrane will shrink with time due to thermal stress and/or be partially destroyed. Below 130° C., there exists a risk that condensates will accumulate on the membrane due to dropping below the dew point. The membrane is then wetted by liquid and can no longer act.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for the production of synthetic quartz glass, comprising the following process steps:
  (a) evaporating a production material containing at least one polymerizable polyalkylsiloxane compound while forming a production material vapor;
  (b) passing the production material vapor resulting from process step (a) through at least one cleaning device to purify the production material vapor;
  (c) supplying the purified production material vapor resulting from process step (b) to a reaction zone, in which the production material vapor is converted to $SiO_2$ particles through oxidation and/or through hydrolysis;
  (d) depositing the $SiO_2$ particles resulting from process step (c) on a deposition surface; and
  (e) optionally, drying and vitrifying the $SiO_2$ particles resulting from process step (d) to form synthetic quartz glass,
  wherein the at least one polymerizable polyalkylsiloxane compound is conducted, after evaporation in process step (a) and before pyrolysis or hydrolysis in process step (b), through a membrane filter which is heated to a temperature of 130 to 210° C.

2. The method according to claim 1, wherein the membrane filter is heated to a temperature of 140 to 190° C.

3. The method according to claim 1, wherein the membrane filter is heated to a working temperature which is 3 to 60° C. higher than a dew point of the polyalkylsiloxane compound used, which is established in the steam mixture of the amount of carrier gas and the vaporous polyalkylsiloxane compound.

4. The method according to claim 1, wherein the membrane filter comprises at least one material selected from the group consisting of polytetrafluoroethylene, perfluoroalkoxypolymers, perfluoroalkoxyvinyl-ethers and polyethersulfones.

5. The method according to claim 1, wherein a pore size of the membrane filter is up to 0.5 μm.

6. The method according to claim 1, wherein an average maximum thickness of the membrane filter is less than 200 μm parallel to a flow direction of the production material vapor.

7. The method according to claim 1, wherein a pressure difference on the filter membrane between a retentate side and a permeate side is less than 800 mbar.

8. The method according to claim 1, wherein the method is carried out at an absolute pressure of up to 5 bar.

9. The method according to claim 1, wherein the polyalkysiloxane compound is octamethylcyclotetrasiloxane.

10. The method according to claim 1, wherein the content of polyalkysiloxane compound in the production material vapor is at least 15% by volume.

11. The method according to claim 1, wherein the production material vapor additionally comprises an inert gas.

12. Synthetic quartz glass obtainable by the method according to claim 1.

13. The method according to claim 1, wherein the production material vapor additionally comprises an inert gas, and wherein the inert gas is nitrogen.

14. The method according to claim 1, wherein the at least one polymerizable polyalkysiloxane compound is octamethylcyclotetrasiloxane (OMCTS), wherein the production material vapor additionally comprises nitrogen as an inert gas and wherein a molecular ratio of OMCTS to nitrogen is in the range from 0.015 to 1.5.

15. The method according to claim 1, wherein the membrane filter is heated to a working temperature which is 7 to 40° C. higher than the dew point of the at least one polymerizable polyalkylsiloxane compound, which is established in the steam mixture of the amount of carrier gas and the vaporous polyalkylsiloxane compound.

16. The method according to claim 1, wherein a pore size of the membrane filter is up to 0.2 μm.

17. The method according to claim 1, wherein a pore size of the membrane filter is up to 0.02 μm.

18. The method according to claim 1, wherein an average maximum thickness of the membrane filter is less than 100 μm parallel to a flow direction of the production material vapor.

19. The method according to claim 1, wherein an average maximum thickness of the membrane filter is less than 50 μm parallel to a flow direction of the production material vapor.

20. The method according to claim 1, wherein a pressure difference on the membrane filter between the retentate and permeate side is less than 600 mbar.

21. The method according to claim 1, wherein a pressure difference on the membrane filter between the retentate and permeate side is less than 400 mbar.

22. An apparatus for the production of synthetic quartz glass comprising:
   at least one evaporator zone for evaporating at least one production material which contains at least one polymerizable polyalkylsiloxane compound to form a production material vapor;
   at least one reaction zone into which the production material vapor is led and in which the production material vapor is converted to SiO₂ particles by pyrolysis or by hydrolysis; and
   at least one deposition zone with a deposition zone for the SiO₂ particles to form synthetic quartz glass; and
   at least one membrane filter which is heated to a working temperature of 130 to 210° C.,
      wherein an average maximum thickness of the at least one membrane filter is less than 200 μm parallel to a flow direction of the production material vapor.

23. The apparatus according to claim 22 wherein the membrane filter is heated to a temperature of 140 to 190° C.

24. The apparatus according to claim 22, wherein the average maximum thickness of the membrane filter is less than 100 μm parallel to a flow direction of the production material vapor.

25. The apparatus according to claim 22, wherein the average maximum thickness of the membrane filter is less than 50 μm parallel to a flow direction of the production material vapor.

26. The apparatus according to claim 22, wherein a pore size of the membrane filter is up to 0.2 μm.

27. The apparatus according to claim 22, wherein a pore size of the membrane filter is up to 0.02 μm.

28. A method for purifying a production material vapor in the production of synthetic quartz glass which contains at least one polymerizable polyalkylsiloxane compound, the method comprising: after evaporation and before pyrolysis, conducting the at least one polyalkylsiloxane compound through a membrane filter which is heated to a temperature of 130 to 210° C.

* * * * *